United States Patent [19]

Ahonen

[11] 4,202,658

[45] May 13, 1980

[54] GLIDE-CASTING MACHINE FOR THE MANUFACTURING OF HOLLOW SLABS AND EQUIVALENT

[75] Inventor: Esko M. Ahonen, Viiala, Finland

[73] Assignee: Paraisten Kalkki Oy-Pargas Kalk AB, Parainen, Finland

[21] Appl. No.: 924,438

[22] Filed: Jul. 13, 1978

[30] Foreign Application Priority Data

Aug. 10, 1977 [FI] Finland ..................................... 772406

[51] Int. Cl.[2] .................................................. B29B 1/04

[52] U.S. Cl. .......................................... 425/64; 264/70; 425/207; 425/209; 425/425; 425/456

[58] Field of Search .................... 425/425, 64, 63, 219, 425/207, 209, 456, 432, 454, 382 R; 264/70

[56] References Cited

U.S. PATENT DOCUMENTS

| | | | |
|---|---|---|---|
| 3,284,867 | 11/1966 | Booth | 425/64 |
| 3,423,492 | 1/1969 | Jonell et al. | 425/64 |
| 3,994,639 | 11/1976 | Hewitt | 425/64 |
| 4,022,556 | 5/1977 | Goetjen | 425/64 |
| 4,133,619 | 1/1979 | Wise | 425/64 |

FOREIGN PATENT DOCUMENTS

| | | | |
|---|---|---|---|
| 1476879 | 6/1977 | United Kingdom | 264/70 |

*Primary Examiner*—Donald J. Arnold
*Attorney, Agent, or Firm*—Cushman, Darby & Cushman

[57] ABSTRACT

A glide-casting machine for the manufacturing of hollow concrete elements. The machine is movable in relation to a casting base and comprises means for feeding concrete mix onto a number of screw feeders with vibrator sleeves constituting extension of each screw feeder. In addition, the machine comprises external vibrating means. In connection with each screw feeder there are provided on one hand, two guide plates parallel to the axis of the screw feeder, which guide plates follow the shape of the screw feeders in the bottom portion of the screw feeders. Between the guide plates there is an elongated space parallel to the axis of the screw feeder so as to allow concrete mix to fall straight onto the base on a substantial portion of the length of the screw feeder. On the other hand there are provided flow plates which follow the shape of the outermost screw feeders from above and from the sides.

14 Claims, 6 Drawing Figures

FIG. 5
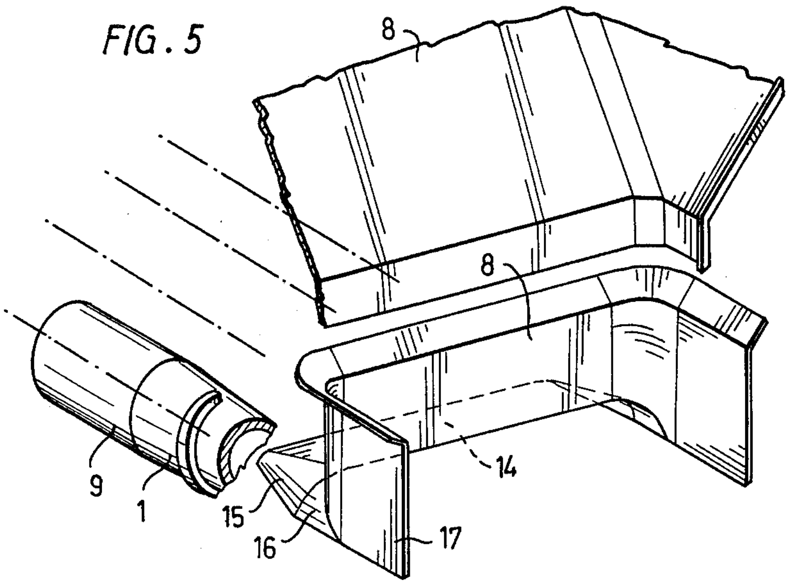
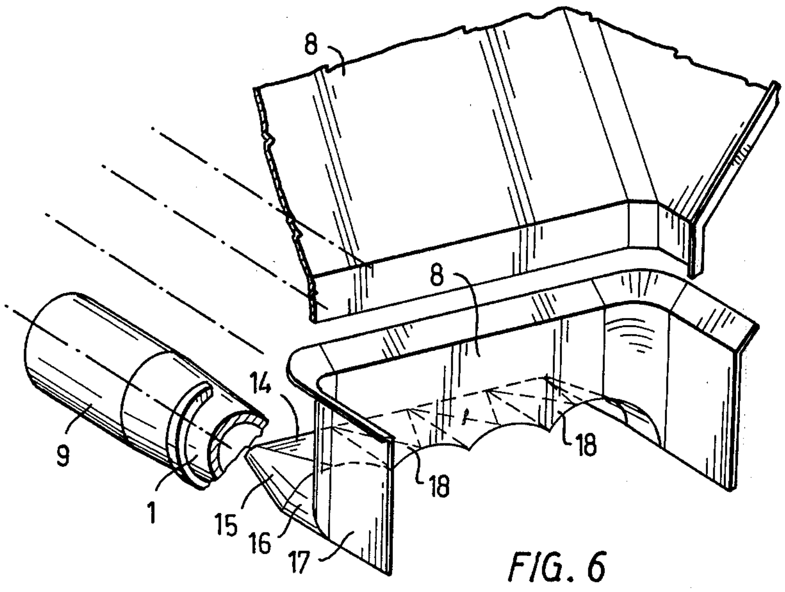
FIG. 6

GLIDE-CASTING MACHINE FOR THE MANUFACTURING OF HOLLOW SLABS AND EQUIVALENT

The present invention relates to a glide casting machine for the manufacturing of hollow slabs and equivalent, which machine is movable in relation to a casting base and which comprises:

means for feeding concrete mix, at least two screw feeders, vibrator sleeves constituting extension of each screw feeder, and external vibrating means.

Previously, a glide-casting machine is known in which underneath each screw feeder there is a feeding trough of semicircular cross-section. A drawback of such a construction is that the pre-stressing strands nearest the casting base tend to slide because a sufficient quantity of non-viscous mix is not received onto the casting base. It follows from this that the distance of the wires from the casting base can hardly be increased from the present typical maximum value of 35 mm. This, on the other hand, restricts the range of use of the manufactured hollow slabs, e.g., out of reasons of fire security. When the protective distance is too small, the prestressing of the wires is released quite soon in a fire, whereby the strength of the element is suddenly reduced.

Another drawback that occurs in glide-casting machines so far used is that thin portions tend to develop at the upper corners of the hollow slab to be produced at the outermost screw feeders. This results from the fact that the outermost screws require a higher output or feeding capacity as compared with the intermediate screws because the outer screws must also be able to fill the corner areas concerned. In some cases this has been solved so that screw feeders of higher capacity have been used as outer feeders.

The object of the present invention is to eliminate the above drawbacks. On one hand, the invention is based on the idea that the concrete mix is allowed to fall onto the casting base covered with water as early as possible, whereby it is mixed with water and is plasticized. When the machine moves forwards, the screw feeders press the plasticized concrete mix between themselves from where the mix then rises upwards into the space between the screws where the prestressing strands are placed. Then the plasticized concrete mix permits the prestressing strands to remain in position.

On the other hand, the invention is based on the idea that by positioning, in connection with the screw feeders, flow plates or equivalent at certain locations, it is possible to avoid the production of said thin portions.

By combining the above two ideas, a glide-casting machine has now been developed by means of which it is possible to manufacture hollow slabs and equivalent of exceptional strength and of exceptionally high quality.

This is achieved by means of a glide-casting machine in accordance with the present invention, which is mainly characterized in that in connection with each screw feeder there are, on one hand, two guide plates at least substantially parallel to the axis of the screw feeder, which guide plates at least partly follow the shape of the screw feeders in the bottom portion of the screw feeders, said guide plates further defining between themselves an elongated space at least substantially parallel to the axis of the screw feeder so as to allow concrete mix to fall straight onto the base at least on a substantial portion of the length of the screw feeder and, on the other hand, flow plates which follow at least the outermost screw feeders from sbove and from the sides.

By means of the invention, considerable advantages are obtained. Thus, the location of wires may be raised to a higher level than today, e.g., to 50 mm, in which case the range of use of the hollow slab increases because the resistance to fire can be made considerably better when the protective distance increases. At the same time, the top face of the slab becomes straighter, i.e., no bumps are produced. Moreover, sliding of the wires can be reduced considerably.

Moreover, the mix guide plates permit feeding of additional mix to the feed area of the lateral screws, where the feed area of the screws is 30 percent higher than the feed area of the middle screws. The sides of the element become denser and so-called lateral sinking is reduced. The guide plates also permit elimination of faults arising from unbalanced direction of rotation. Such faults are, e.g., different thicknesses of intermediate walls, elevations in finished slab and one side of the slab being higher than the other.

Moreover, the use of flow plates permits production of hollow slabs of uniform quality without having to use screw feeders of different kinds and different capacities in the same glide-casting machine.

The invention will be examined more closely below with the aid of the exemplifying embodiments in accordance with the drawing.

FIG. 5 is a perspective view of one construction of flow plate in accordance with the invention.

FIG. 6 is a perspective view of another construction of flow plate in accordance with the invention.

Figure 1:
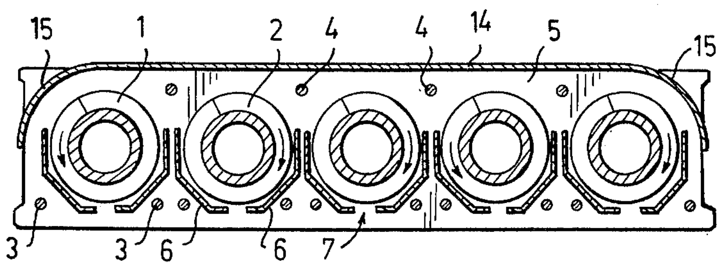
FIG. 1 is a cross-sectional view of guide plates and flow plates in accordance with the invention.
Figure 2:
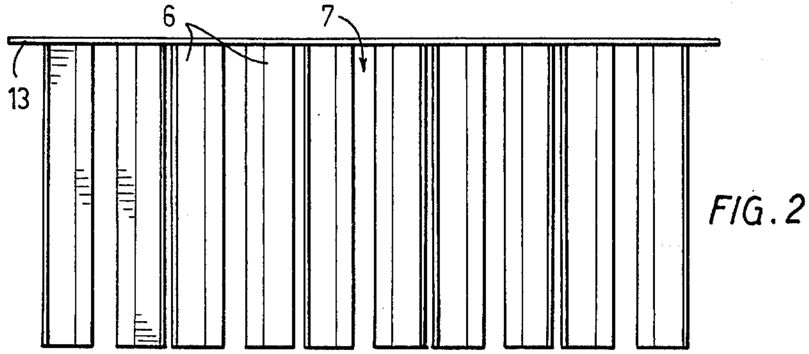
FIG. 2 shows the guide plates of the embodiment shown in FIG. 1 as viewed from above.

In the exemplifying embodiment shown in FIGS. 1 and 2, in connection with each of the five screw feeders 1, 2 there are two guide plates 6 parallel to the axis of the screw feeder 1, 2, which guide plates follow the shape of the screw feeder 1, 2 from underneath and from the sides. The guide plates 6 in connection with the same screw 1, 2 are reflected images of each other and comprise a horizontal bottom portion, a vertical side portion as well as an inclined intermediate portion that connects these parts to each other. Between the guide plates 6 there is an elongated space 7 of uniform width and substantially parallel to the axis of the screw feeder 1, 2, the width of which space is 12 to 25% of the cross-sectional diameter of the spiral part of the screw feeder 1, 2 and preferably 16 to 18 percent of this diameter. In the example case the width of the space 7 is 35 mm while the diameter of the spiral part of the screw 1, 2 is about 100 mm. The guide plates 6 are at their end facing the direction of movement of the machine fastened, e.g., by welding, to a common transversal plate 13, whereby the spaces 7 have a length equal to the length of the guide plates 6.

Figure 4:
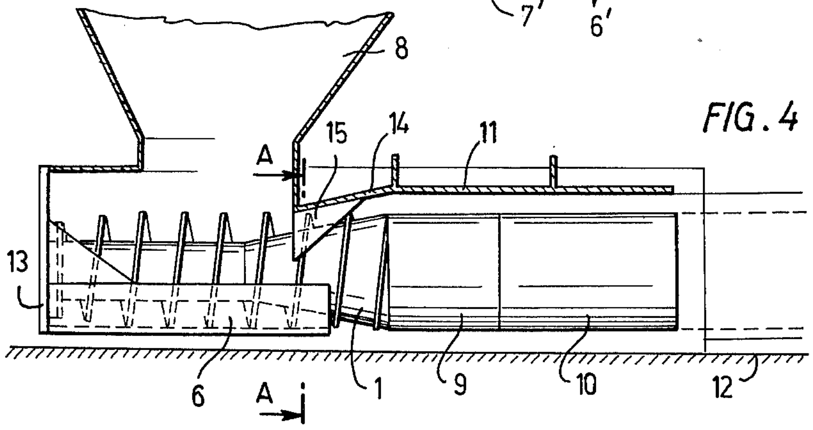
FIG. 4 is a schematical view of the position of one guide plate and one flow plate in relation to the other components of the glide-casting machine as viewed from the side.

From FIG. 1, which is at the same time a sectional view along line A—A in FIG. 4, it is seen how the flow plates 15 are of one piece with the horizontal front plate placed in the lower part of the feeding hopper 8 and showing in the direction of feeding of the screws 1. At the front edge of the lower part of the feeding hopper 8 the cross-section of the flow plates 15 is approximately of the shape of a quarter of a circle following the cross-section of the outermost screw feeders 1.

Figure 3:
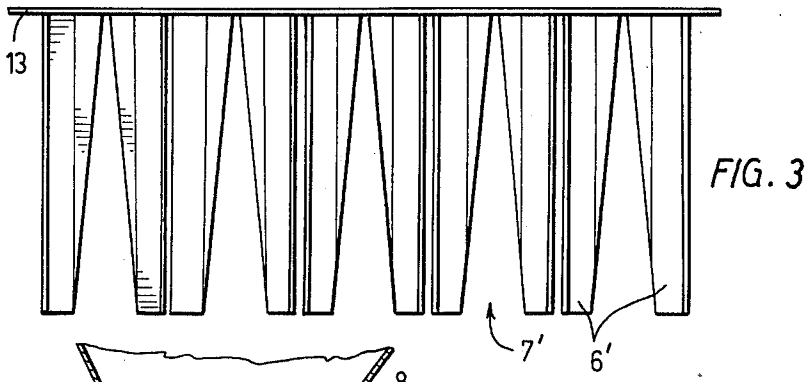
FIG. 3 shows guide plates of another embodiment as viewed from above.

In the exemplifying embodiment of FIG. 3, the width of the space 7' between the guide plates 6' increases in the direction of feeding of concrete. In the direction of feeding of concrete, the width of the space 7' increases from a lowest value of 0 to 10 percent to a highest value of 30 to 70 percent of the diameter of the cross-section of the spiral portion of the screw feeder 1, 2.

In the machine in accordance with FIG. 4 each screw feeder 1 is provided with an extension consisting of a vibrating sleeve 9', which sleeve is again extended by a following glide pipe 10. The diameter of the vibrating sleeve 9 and of the glide pipe 10 is about 190 mm. The machine is arranged so that it moves along rails, which are not shown in the drawing. When rotating, the screws 1, 2 push concrete mix forwards in the horizontal direction, whereby the glide-casting machine moves in the opposite direction owing to the effect of the reaction force. It should be mentioned that the outermost screw 1 rotates downwards on its outer side, and at the same time the next screw 2 rotates in the opposite direction (the directions of rotation of the screws appear from FIG. 1). Above the vibrating sleeve 9 and partly above the glide pipe 10 there is a vibrating balk 11 in the machine, which balk produces the external vibration with the aid of a vibrator not shown in the drawing. On the other hand, the feeding hopper 8 is placed approximately above the middle point of the screws 1, 2.

Owing to appropriate design of the guide plates 6 (FIG. 1), the lower prestressing strands 3 can be raised to the distance of 50 mm from the casting base 12 at the same time as the concrete mix passing down through the spaces 7 is mixed with the water present on the casting base as a layer of 10 to 15 cm and is plasticized, thereby producing a very firm adhesion.

As appears from FIGS. 4 and 5, the flow plates 15 extend over part of the axial length of the conical portion of the screw feeder 1. The shape of the plates 15 is at least approximately the shape of conical curved surfaces tapered in the direction of feeding of the screws 1. As is shown in FIG. 5, they may also consist of a cylindrical surface portion 16 and of a conical surface portion 15.

In the embodiment in accordance with FIG. 6, all the screw feeders 1 are provided with flow plates 15 and 18. In such a case these flow plates 15 and 18 constitute a considerable part of said front plate 14 and are of one piece with it. The outer flow plates 15 are of course, at their outer edge, connected with the mould side wall structure of the glide-casting machine, not shown in the drawing.

Within the scope of the present invention, it is possible to conceive of several modifications differing from the exemplifying embodiments described above. Thus, the spaces between the guide plates may also have curved outlines, or they may be non-continuous and shorter than the length of the plates. In stead of being angular in shape, the cross-section may be, e.g., an arc of a circle. Two adjoining guide plates, related to different screw feeders, may have, e.g., a common vertical part. The spaces between the guide plates may also become narrower in the direction of feeding of the concrete.

What I claim is:

1. A glide-casting machine for the manufacturing of hollow slabs and equivalent, which machine is movable in relation to a casting base and which comprises:
   - means for feeding concrete mix;
   - at least two screw feeders;
   - vibrator sleeves constituting extension of each screw feeder;
   - external vibrating means;
   - two guide plates in connection with each screw feeder, arranged at least substantially parallel to the axis of the corresponding screw feeder, said guide plates at least partly following the shape of the corresponding screw feeder in the bottom portion thereof, said guide plates further defining between themselves an elongated space at least substantially parallel to the axis of the screw feeder so as to allow concrete mix to fall straight onto the base at least on a substantial portion of the length of the screw feeder; and
   - flow plates which follow at least the shape of the outermost screw feeders from above and from the sides.

2. A glide-casting machine as claimed in claim 1, wherein the space is of uniform width.

3. A glide-casting machine as claimed in claim 1, wherein the width of the space increases in the direction of feeding of concrete.

4. A glide-casting machine as claimed in claim 1, wherein the space extends over the whole length of the guide plates.

5. A glide-casting machine as claimed in claim 2, wherein the width of the space is 12 to 25 percent of the cross-sectional diameter of the spiral portion of the screw feeder.

6. A glide-casting machine as claimed in claim 5, wherein the width of the space is 16 to 18 percent of the cross-sectional diameter of the spiral portion of the screw feeder.

7. A glide-casting machine as claimed in claim 3, wherein the width of the space increases in the direction of feeding of concrete from a lowest value of 0 to 10 percent to a highest value of 30 to 70 percent of the cross-sectional diameter of the spiral part of the screw feeder.

8. A glide-casting machine as claimed in claim 1, wherein flow plates are provided only at the outermost screw meeders.

9. A glide-casting machine as claimed in claim 1, wherein flow plates are provided at all screw feeders.

10. A glide-casting machine as claimed in claim 1, wherein the flow plates constitute a part of the front plate connected to the means for feeding the concrete mix.

11. A glide-casting machine as claimed in claim 1, wherein the flow plates are at least approximately of the shape of portions of curved conical surfaces tapered in the direction of feeding of the screws.

12. A glide-casting machine as claimed in claim 1, wherein the flow plates comprise a cylindrical surface portion and a conical surface portion.

13. A glide-casting machine movable along a horizontal casting base for manufacturing hollow slabs comprising: a plurality of generally horizontal parallel screw feeders arranged side-by-side for feeding concrete mix in a forward direction in a manner to form a hollow slab; vibrating means for vibrating cement mix acted on by the screw feeders; two guide plates associated with each screw feeder, arranged at least substantially parallel to the axis of the corresponding screw feeder, said guide plates at least partly conforming to the shape of the bottom portion of the corresponding screw feeder, said guide plates further defining between themselves an elongated space at least substantially parallel to the axis of the corresponding screw feeder so as to allow concrete mix to fall straight onto the base at least along a substantial portion of the length of the screw feeder; hopper means for feeding concrete mix downwardly into engagement with at least one of the screw feeders, said hopper having a side wall which faces in said forward direction; and means for reducing the tendency for thin portions to develop at the upper corners of the concrete slab to be produced by the machine, said means including a front plate directly overlying axial portions of the screw feeders at a location forward of said forwardly facing hopper side wall and flow plates along side of and conforming to the shape of the respective axial portions of the outermost screw feeders, said flow plates being joined to said front plate and said front plate being joined to said forwardly facing hopper side wall.

14. A glide-casting machine as in claim 13 wherein said axial portions of said screw feeders are conical, with the largest diameter thereof being spaced forwardly of the forwardly facing hopper side wall, wherein said front plate is inclined upwardly and forwardly and wherein said flow plates are curved and complementary to the conical outermost screw feeders.

* * * * *